Feb. 10, 1931.  H. D. YODER  1,791,547
CENTRIFUGAL DEVICE FOR BEARINGS
Filed Aug. 5, 1929
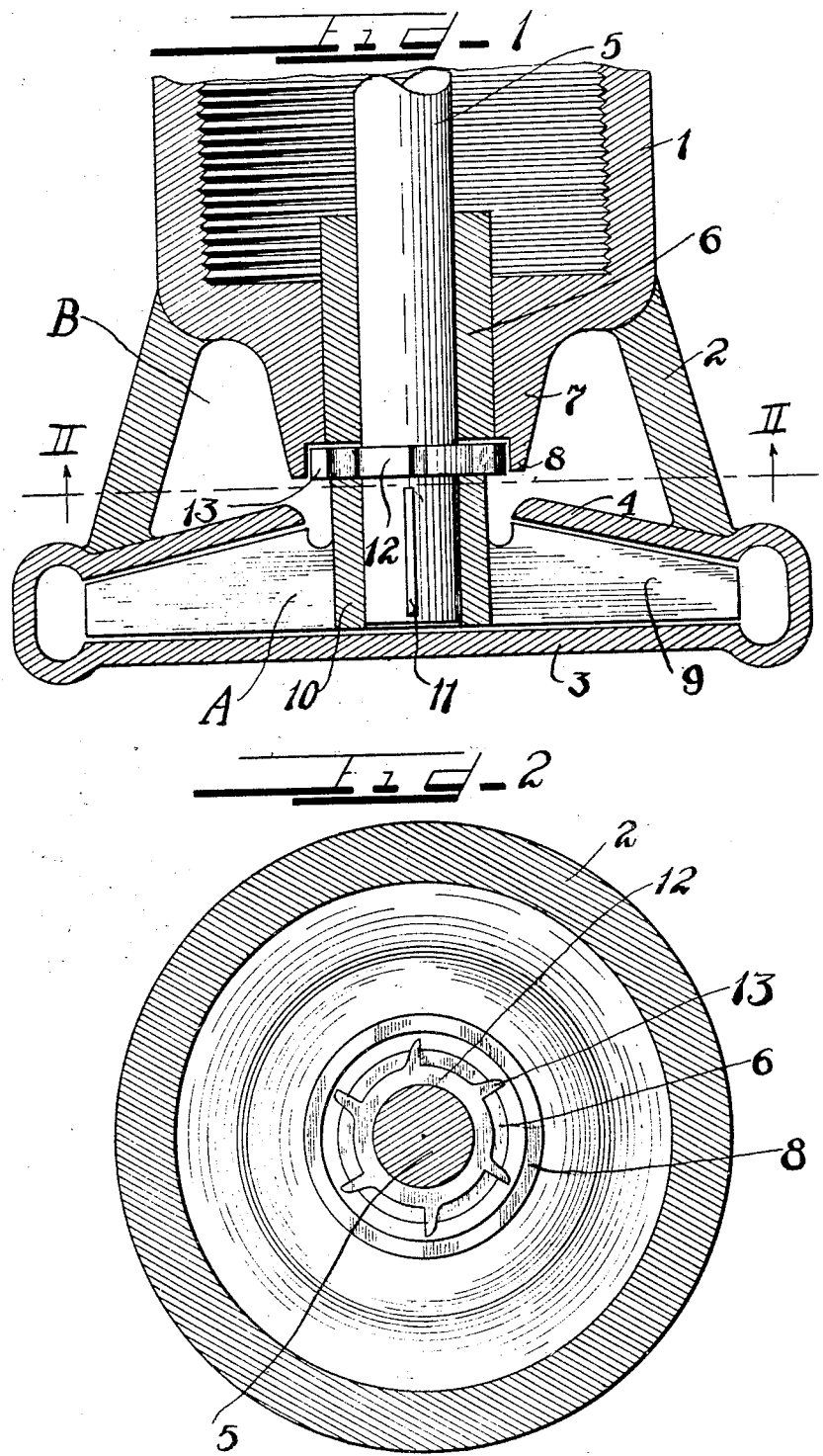
Inventor
Howard D. Yoder Patented Feb. 10, 1931

1,791,547

UNITED STATES PATENT OFFICE

HOWARD D. YODER, OF DETROIT, MICHIGAN, ASSIGNOR TO PENBERTHY INJECTOR COMPANY, OF DETROIT, MICHIGAN, A CORPORATION OF DELAWARE

CENTRIFUGAL DEVICE FOR BEARINGS

Application filed August 5, 1929. Serial No. 383,457.

This invention relates to a centrifugal device for bearings and has particular reference to the arrangement immediately adjacent a shaft bearing in a sump pump or like centrifugal machine, of means for setting up centrifugal forces at the bearing whereby solid matter in the liquid passing thru the machine is, by centrifugal action, kept away from the bearing and therefore wear on the bearing, due to the presence of foreign matter in the liquid, is eliminated.

An object of the invention is to provide means for prolonging usefulness of shaft bearings in sump pumps.

Another object of the invention is to provide means for preventing gritty matter from wearing shaft bearings in centrifugal pumps.

A further object of the invention is to provide means for eliminating wear on shaft bearings in sump pumps and the like whereby the foreign or gritty matter is moved away from the bearings by centrifugal action.

A still further object of the invention is to provide means for prolonging wear of shaft bearings in sump pumps and the like which is economical to manufacture and efficient in use.

The above, other and further objects of the invention will be apparent from the following description, accompanying drawings and appended claim.

According to the invention, the pump impeller shaft has means provided thereon adjacent the shaft bearing within the pump casing for creating centrifugal action adjacent the bearing whereby such action will drive away from the bearing gritty and other foreign matter present in the fluid passing thru the pump.

An embodiment of the invention is illustrated in the accompanying drawings, and the views thereof are as follows:

Figure 1 is a central vertical section thru a part of a centrifugal sump pump having the shaft provided with an embodiment of the present invention.

Figure 2 is a horizontal sectional view taken substantially on lines II—II of Figure 1.

As shown on the drawings:

The form of apparatus chosen to exemplify the present invention as illustrated in the accompanying drawings includes a portion of a centrifugal pump casing 1 having a pump chamber compartment 2 with a bottom 3 and impeller casings defined between the bottom 3 and an upper wall 4.

A vertical shaft 5 passes thru a bearing 6 supported in an extension 7 of the lower part of the casing 1. The portion 7 has a depending flange 8 about its lower end which flange is shown as extending below the lower end of the bearings 6. The impeller A consists of a plurality of impeller arms 9 connected to a hub 10 which is fastened by suitable means, such as a key 11, to the shaft 5.

Fluid is admitted to the center of the impeller chamber thru the base B and is forced outwardly at the periphery of the impeller chamber as is common practice.

A wheel 12 is fastened to the shaft 5 to rotate with said shaft within the space defined by the depending flange 8 of the portion 7 of the casing 1. The wheel 12 is shown as provided with a plurality of outwardly extending fingers 13, altho the wheel, of course, may be provided with other means than these fingers, if desired.

The shaft 5 is rotated at high speed in any usual manner and the wheel 12, with its projections or fingers 13 rotating with the shaft, sets up within the space defined by the depending flange 8 and in the zone of action immediately below said flange such centrifugal action that gritty matter, such as dirt, sand and the like, is whirled outwardly towards the wall 2 and thus away from the bearing 6. The gritty matter passes o .; thru the edges of the pump under influence of the impeller arms 9, having fallen into the impeller chamber thru the entrance thereto about the hub 10 of the impeller A.

The wheel 12 which herein is referred to as a slinging member may, as before stated, be provided with fingers 13 substantially like a paddle wheel, but any suitable slinging member may be utilized. A member having a smooth surface even might answer the purpose of creating centrifugal action immediately below the bearing 6.

A sump pump was operated with and without the slinging member of this invention and the results were as follows:

A sump pump was operated using one pound of coarse sand to every gallon of water, where there was no slinging member present, and the diameter of the bearing wore $1/64$ of an inch in 48 hours and was completely worn out in 78 hours. The same sump pump equipped with a slinging member of this invention showed a wear of $1/64$ of an inch in diameter of the bearing 6 in 848 hours and wore out in 1200 hours of use, thereby prolonging the life of the bearing approximately 1500%.

The invention contemplates the provision of some sort of attachment to the impeller shaft immediately below the shaft bearing of such nature as to create centrifugal action immediately below the bearing so as to prevent foreign matter in the liquid passing thru the pump from reaching the bearing.

The invention has been described herein more or less precisely as to details, yet it is to be understood that the invention is not to be limited thereto, as it is understood changes may be made in the arrangement and proportion of parts and that equivalents may be substituted without departing from the spirit and scope of the invention.

The invention is claimed as follows:

A centrifugal pump comprising a vertical casing, a vertical shaft in said casing, an extension adjacent the end of said casing having an aperture therethrough, a bearing for said shaft in said aperture, a depending flange on said extension offset from the walls of said aperture providing an open ended recess in said extension immediately below the end of said bearing, an impeller chamber in the end of said casing having a top wall sloping toward but stopping short of said depending flange to define a passage therebetween, a fluid supply chamber defined by said top wall and extension and opening into said impeller chamber and said recess through said passage, and centrifugal means located in said recess and secured to said shaft for forcing foreign matter entering said recess from said fluid supply chamber away from said bearing and against said depending flange which directs said foreign matter into said impeller chamber.

In testimony whereof I have hereunto subscribed my name at Detroit, Wayne County, Michigan.

HOWARD D. YODER.